(12) United States Patent
Liao

(10) Patent No.: US 7,886,640 B2
(45) Date of Patent: Feb. 15, 2011

(54) ROTATIONAL CUTTING MACHINE

(75) Inventor: Ming-Ko Liao, Ta-Li (TW)

(73) Assignee: Taiwan More-Cash Villager Corp., Taichung (TW)

( * ) Notice: Subject to any disclaimer, the term of this patent is extended or adjusted under 35 U.S.C. 154(b) by 230 days.

(21) Appl. No.: 12/044,366

(22) Filed: Mar. 7, 2008

(65) Prior Publication Data
US 2009/0223338 A1 Sep. 10, 2009

(51) Int. Cl.
*B23D 21/00* (2006.01)
(52) U.S. Cl. .............................. 82/70.1; 82/101; 83/469
(58) Field of Classification Search ................. 82/70.1, 82/70.2, 83, 85, 89, 90, 101, 102, 113, 124; 83/703, 469, 471, 663
See application file for complete search history.

(56) References Cited
U.S. PATENT DOCUMENTS
4,093,247 A * 6/1978 Bernard et al. ................ 279/53

| | | | | |
|---|---|---|---|---|
| 4,901,611 A * | 2/1990 | Bentley | ......................... | 82/101 |
| 6,637,097 B2 * | 10/2003 | Miyano | ......................... | 82/124 |
| 7,488,238 B2 * | 2/2009 | Liao | ............................ | 451/234 |
| 2004/0074350 A1 * | 4/2004 | Hanada | ......................... | 82/113 |
| 2004/0211301 A1 * | 10/2004 | Kobayashi et al. | ............ | 82/129 |

* cited by examiner

*Primary Examiner*—Stephen Choi
(74) *Attorney, Agent, or Firm*—Lowe Hauptman Ham & Berner, LLP

(57) ABSTRACT

The present invention relates to a rotational cutting machine, it has a base, on the base is first motive power source to bring the cutting blade rotate; near the cutting blade is a fixing tool that tightly holds an object to be cut, on the side the fixing tool is a second motive power source to turn the fixing tool together with the object to be cut; the fixing tool is set on a platform that is adjustable; when cutting an object, the first motive power source turns the blade rotate, while the second motive power source also turns the object to be cut rotate, through the platform that is movable, the fixing tool is moved towards the cutting blade, such that the object tightly held in the fixing tool can be in contact with the cutting blade, the object then can be cut efficiently and accurately.

3 Claims, 5 Drawing Sheets

ROTATIONAL CUTTING MACHINE

BACKGROUND OF THE INVENTION

1. Field of the Invention

The present invention relates to a cutting machine with both of cutting blade and object to be cut are rotatable that can enhance the cutting effectiveness, cutting quality, and cutting accuracy.

2. Description of Prior Art

Driller is one of the essential tools that a family and carpenters would acquire, and when the head of the driller gets blunt, it must be cut off and sharpened again to keep its head in a sharp condition for easily finishing the kind of job as drilling a hole or enlarging a hole; and, metal pipe is commonly used in construction and many kinds of product, because the required length varies, so metal pipe always need to be cut to the length that fit the use.

Conventional tool to cut head of driller and metal pipe is a saw, on the base of said saw is an apparatus to tightly clip the head of driller or metal pipe, above which are a motor and saw blade which can be moved up and down, such that after the said apparatus tightly clip the head of driller or metal pipe and the motor is then activated, the motor is then leveled down by a worker to cause the head of driller or metal pipe to be cut by the saw blade, the cutted head of driller is then put into sharpening machine for re-sharpening, then a new head of driller is produced and ready to use; while the metal pipe is cut to a required length for proper applications.

The aforesaid method of cutting driller or metal pipe has some defects as follows:
1. because the object has to be clipped tightly by the apparatus, and depressing force be applied to the saw in order to cut the object, as a result, in cutting the object, extreme weight must be enforced, that takes a lot of manpower and time, therefore, the cutting becomes ineffective and time spending.
2. manually press down the saw could easily lead to deviation of angle from right cutting angle during cutting, this causes undesired cutting quality.
3. the cutting by conventional saw cannot perform high precision cutting and is low in accuracy, therefore its use is limited.

SUMMARY OF THE INVENTION

For these defects noticeable on the prior art, an improvement is seriously required. The inventor has dedicated great efforts for years to studying and improving these defects and come up with a novel cutter with both cutting blade and object to be cut are rotatable thereof as provided in this invention.

The object of present invention is to provide a cutting machine with both of cutting blade and object to be cut are rotatable, such that the cutting is effective and results in high quality.

According to the above mentioned object of present invention, the said cutting machine of present invention has a base, on one side of the base is a first motive power source to bring the cutting blade rotate; near the said blade is a clipper that tightly clips the object to be cut, on the side of the said clipper is a second motive power source which rotates the clipper together with the object to be cut; the clipper is seated above a movable platform; when the cutting of object is performed, the first motive power source brings the cutting blade rotate, while the second motive power source brings the object rotate in another direction, through movement of platform, the clipper that clips tightly the object moves the object towards the rotational cutting blade, then by continuously making the object contact with the blade, in addition to the opposite direction of rotation of the object and the cutting blade, the cutting can be done much more quickly and accurately, thus achieving effective and high quality cutting aimed in the object of present invention.

Another object of present invention is to provide a cutting machine that ensures the object to be cut can be clipped securely.

According to the another object of present invention, the fixing tool on the cutting machine has a T-shape sleeve, one end of the T-shape sleeve can insert into the hole of a fix plate on the base of the cutting machine, the other end has a larger outer diameter, such that after it is inserted into said hole, the other end is exposed to the outside of the hole to form as an outer flange; while a clamper clips on the object and to be inserted into said T-shape sleeve, the clamper has a major component and a secondary component that is joined by screwing the secondary component together with the major component, in the conjoined portion of said components there is a clipper formed as a cylinder shape and made in elastic material such that the end of larger diameter can enclose the larger diameter of object to be cut and that the end of smaller diameter can enclose the smaller diameter of object to be cut.

A more complete understanding of these and other features and advantages of the present invention will become apparent from a careful consideration of the following detailed description of certain embodiments illustrated in the accompanying drawings.

DETAILED DESCRIPTION OF THE PREFERRED EMBODIMENTS

Figure 1:
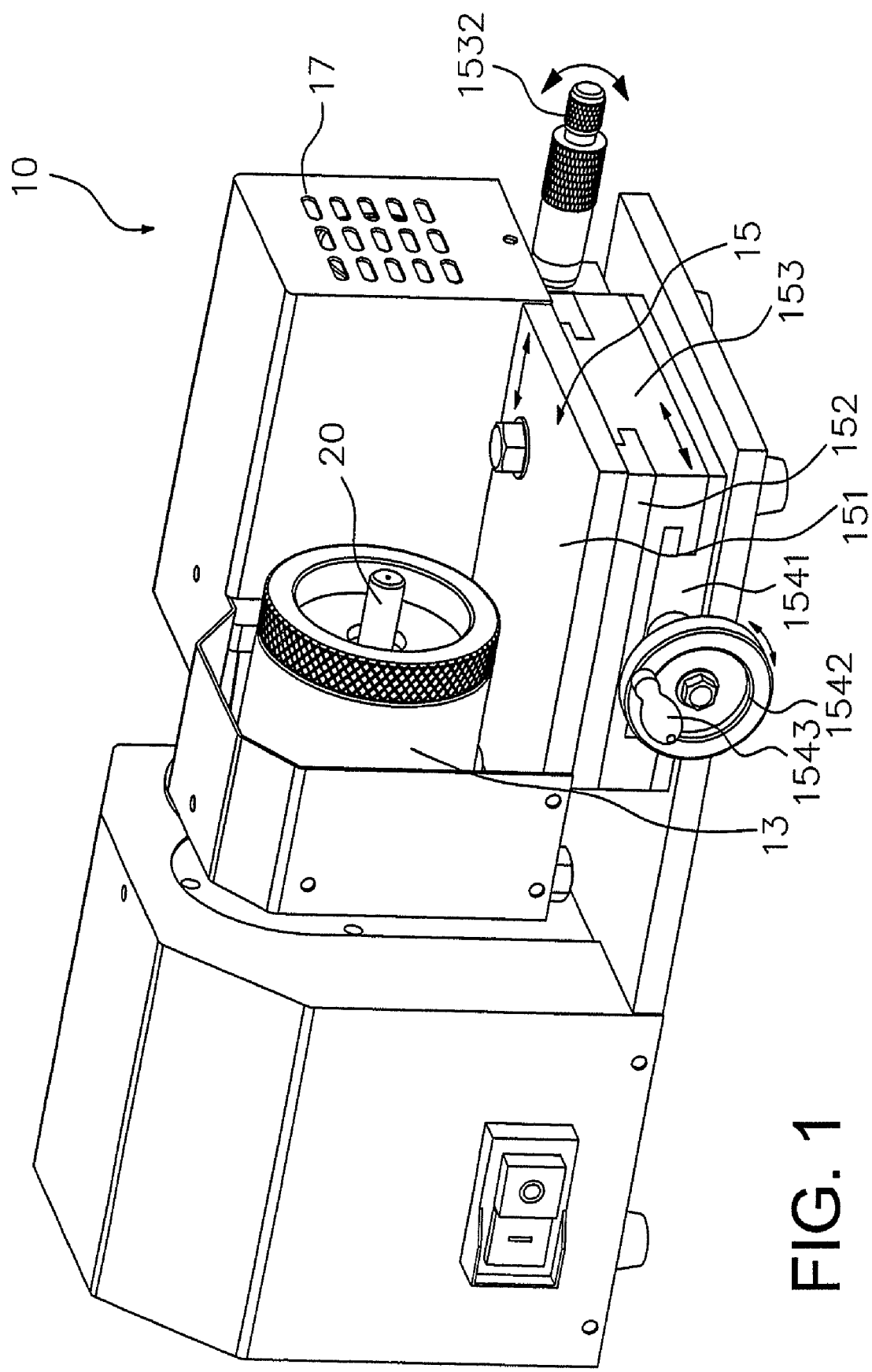
FIG. 1 is a three-dimensional view showing the outline of the rotational cutting machine of present invention.
Figure 2:
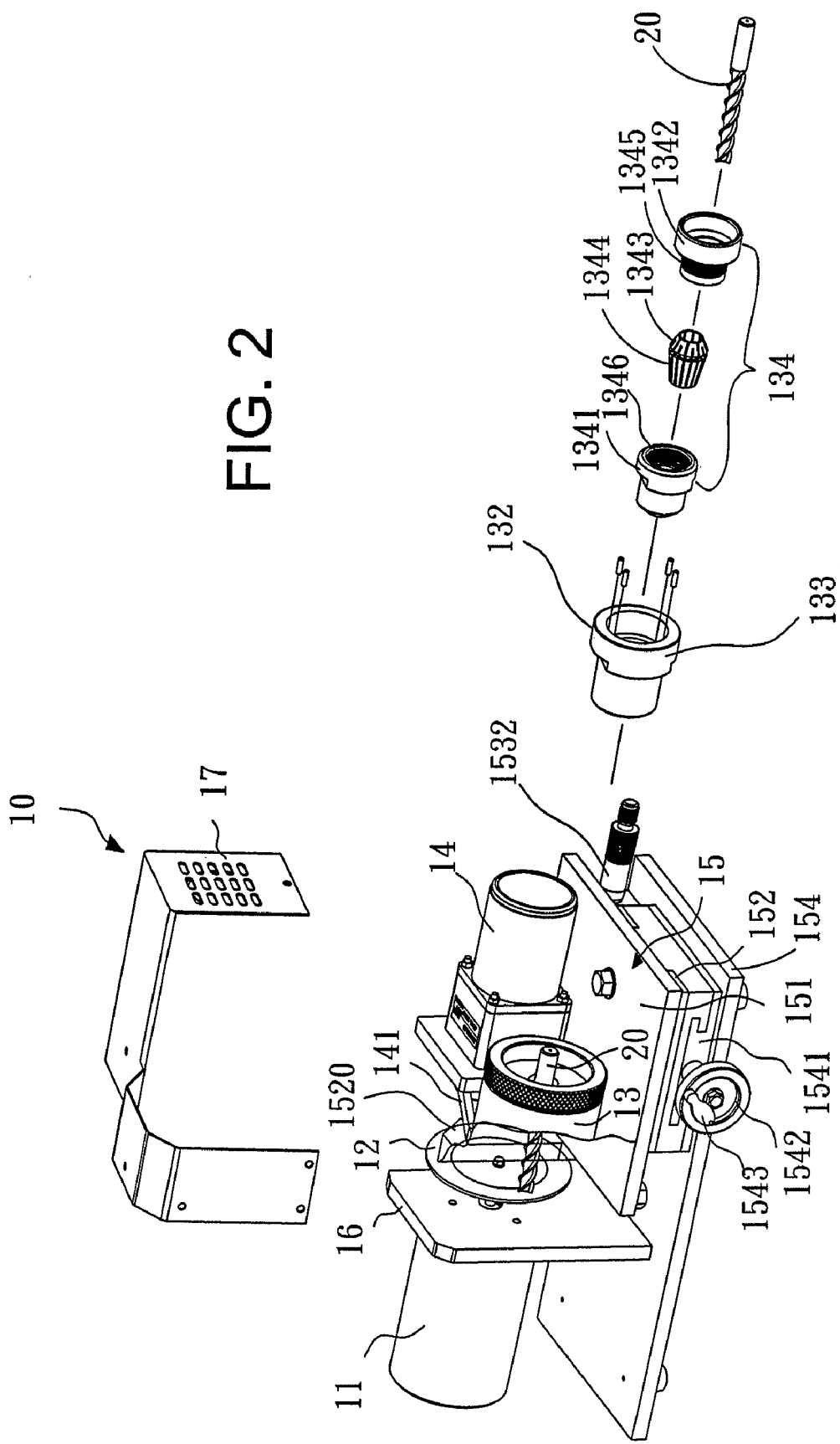
FIG. 2 is an illustrative view showing the rotational cutting machine of present invention in action.
Figure 3:
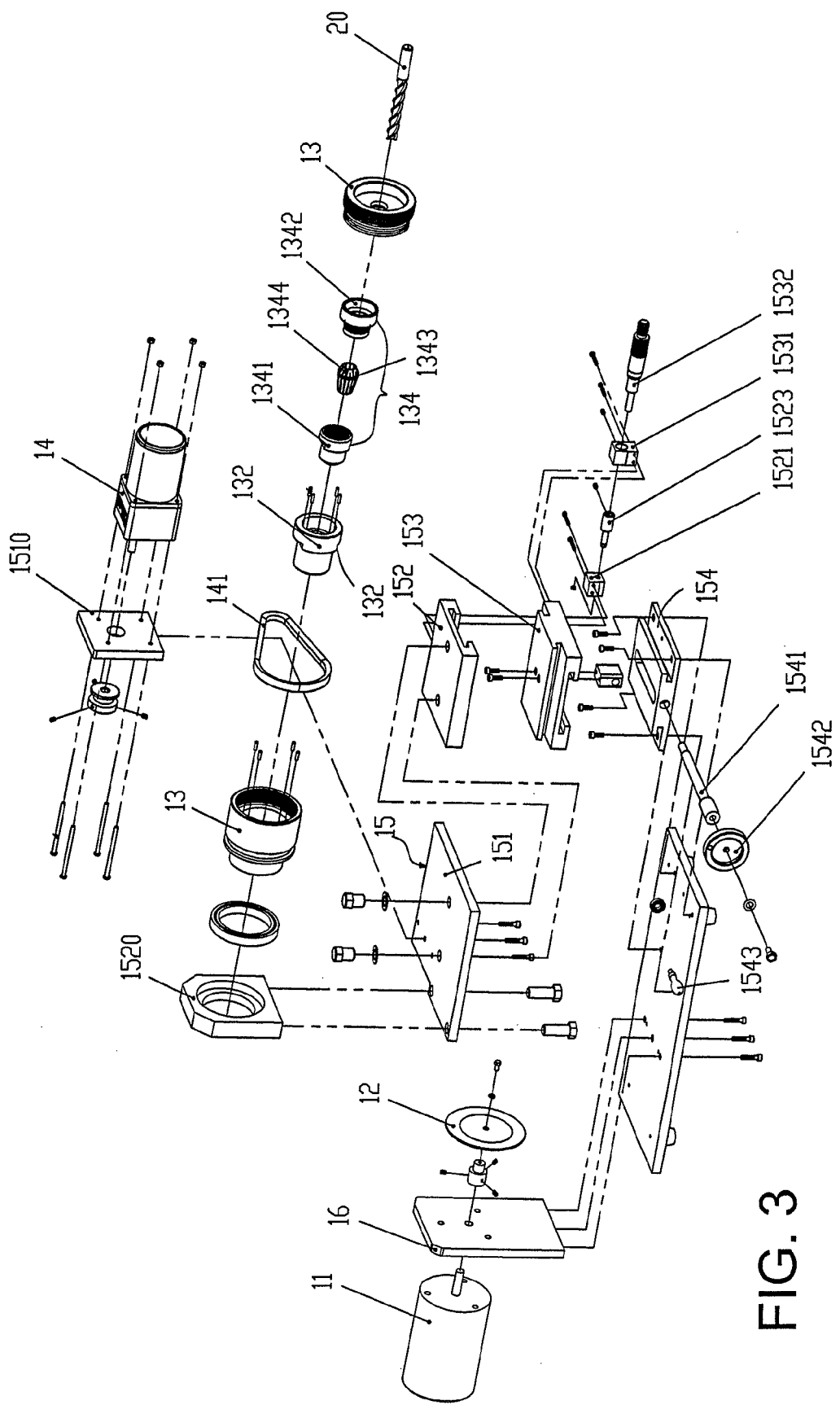
FIG. 3 is a three-dimensional exploded view showing the structure of the rotational cutting machine of present invention.
Figure 4:
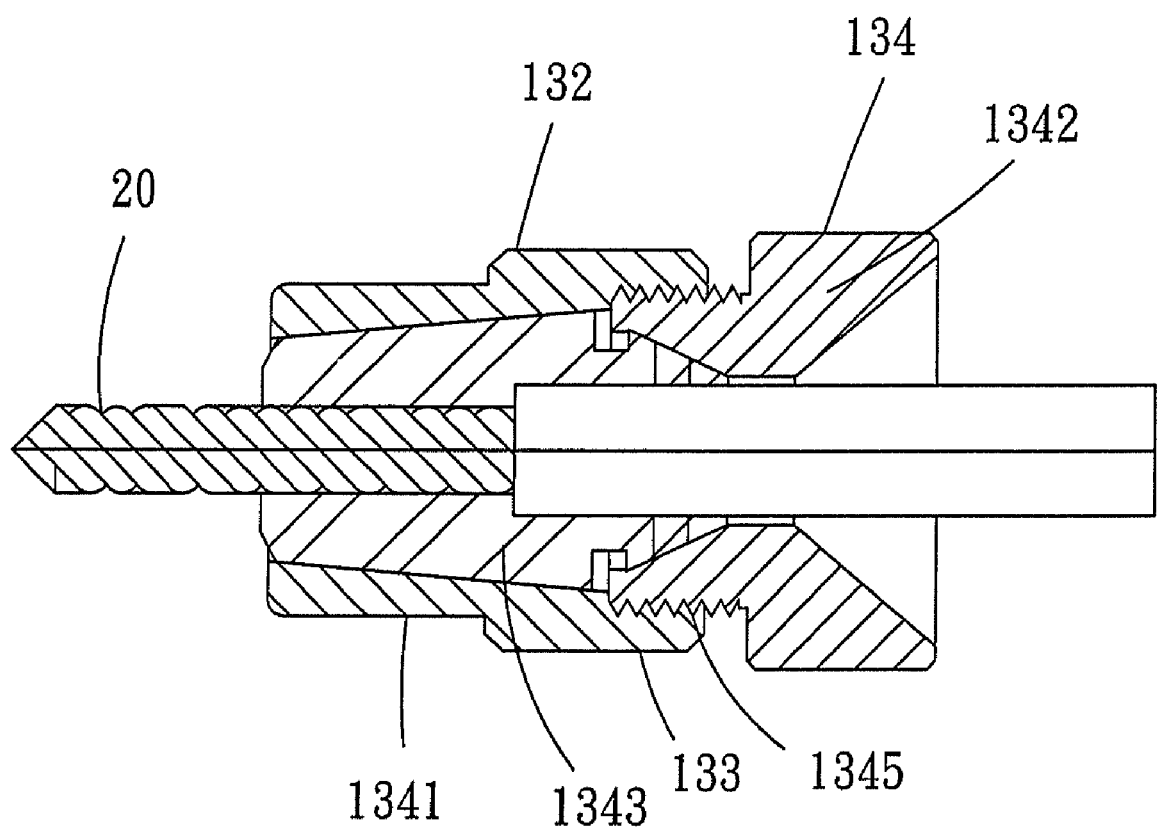
FIG. 4 is a cross-sectional view showing the parts of the rotational cutting machine of present invention.

The present invention relates to a rotational cutting machine, as shown in FIGS. 1, 2 and 3, the rotational cutting machine has a base 10, on one side of base 10 has a first motive power source 11 to rotate a blade 12; on the other side of base 10 near the blade 12 is equipped with a fixing tool 13 for holding the object 20 to be cut (such as head of driller, metal pipe, etc.), and near the fixing tool 13 is a second motive power source 14 to bring the fixing tool 13 together with the object 20 to be cut rotate, the said fixing tool 13 is set above a platform 15 that can be moved.

Figure 5:
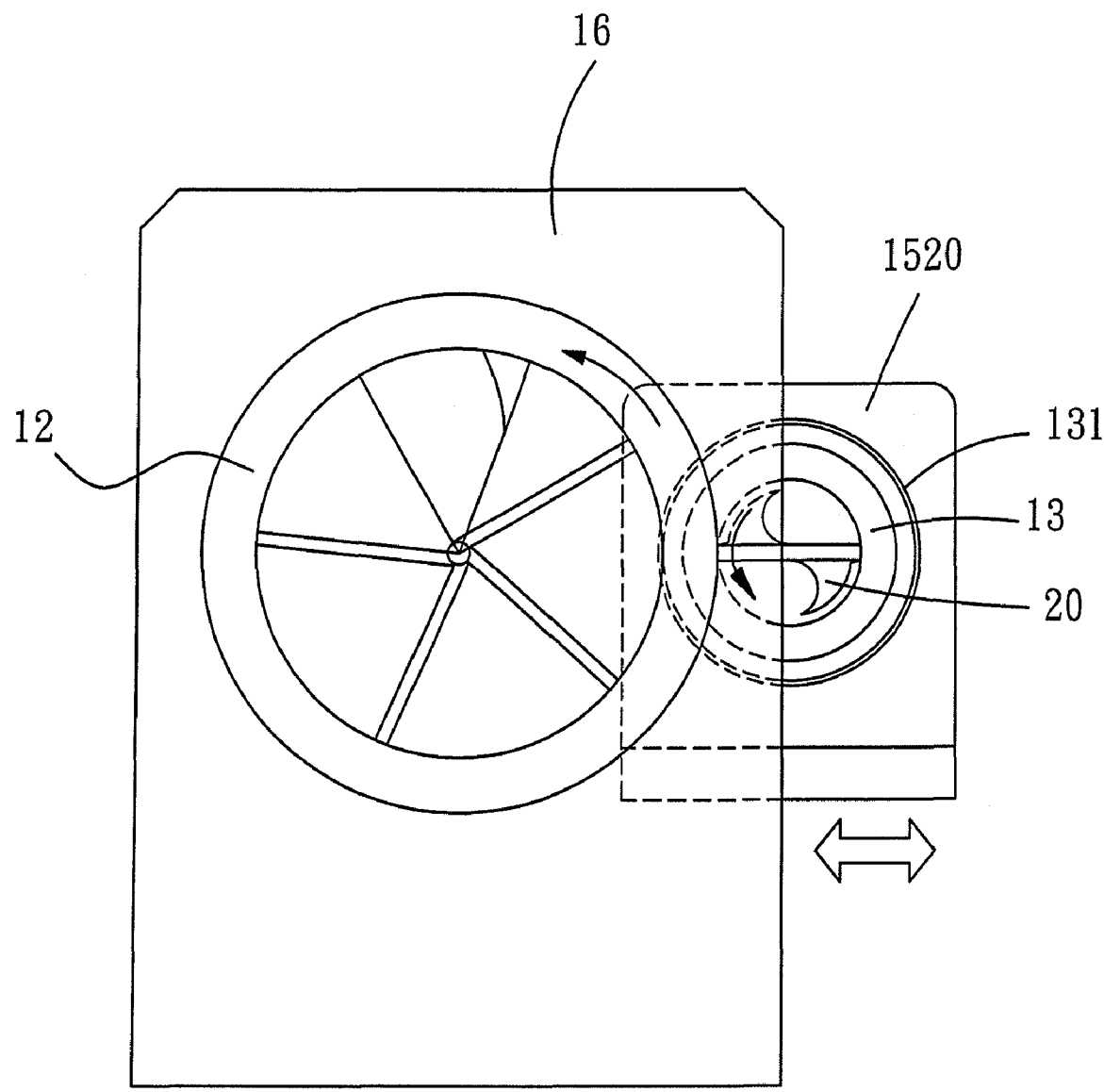
FIG. 5 is an illustrative view showing the rotational cutting machine of present invention in cutting a pipe.

During the cutting of object 20, as shown in FIG. 5, the first motive power source 11 can bring the blade 12 to rotate, while the second motive power source 14 can bring the object 20 rotate preferably in another direction. Through the movable platform 15, the fixing tool 13 is moved towards the blade 12, such that the blade can be in contact with the object 20 clipped by the fixing tool 13, and because the blade and the object preferably rotate in different direction, the object can be cut off quickly and effectively, and only by cutting half of the diameter distance, the object 20 can be cut off, thus achieve the goal to improve cutting effectiveness, cutting quality and cutting accuracy.

Please refer to FIGS. 1, 2, 3 and 4, the said fixing tool 13 has a T-shape sleeve 132 with its one end inserts into a hole 131 of fix plate 1520 on the base 10, the other end is exposed outside said hole 131 and forms an outer flange 133; the object 20 to be cut is clipped by a tubular holder 134, and then the tubular holder 134 can be inserted into said T-shape sleeve 132, the tubular holder 134 has a major component 1341 and a secondary component 1342, the major component 1341 and secondary component 1342 both have conjoining parts 1345, 1346 for joining these two components together; inside the conjoined tubular holder 134 is a clipper 1343, the clipper 1343 is in cylinder shape and is made in an elastic construction with a plurality of clipping claws 1344 such that its one end of larger diameter can firmly hold the larger diameter end of object 20 and its another end of smaller diameter can firmly hold the smaller diameter end of object 20.

Please refer to FIGS. 1, 2 and 3, said first motive power source 11 can be a motor, and the motor can be set onto a fix plate 16 that formed as a part of said base 10, the cutting blade 12 is preferably in circular shape and is set on the axis of the motor, such that the motor can activate the blade 12 to rotate.

Please refer to FIGS. 1, 2 and 3 again, the second motive power source 14 also can be a motor, the motor is also set onto another fix plate 1510 that forms a part of said movable platform 15, on the shaft of the motor is a belt 141, one end of the belt 141 is on the shaft of motor whereas the other end wraps around said fixing tool 13 that firmly holds the clipper 1343 and the object 20 to be cut, then the motor can bring the fixing tool 13 rotate in a direction same or opposite to the rotation direction of the blade 12 by of the belt 141.

Please refer to FIGS. 1, 2, and 3 again, the fixing tool 13 is installed on the fix plate 1520 of said movable platform 15, and the fixing tool 13 can be rotated by second motive power source 14, and cause object 20 easily extended out of the fix plate 1520 to contact with the blade 12 for cutting.

Please refer to FIGS. 1, 2 and 3 again, a fix base plate 151 is set on said movable platform 15, beneath said fix base plate 151 is a first adjustable platform 152, the bottom of the said first adjustable platform 152 is mounted with a left-right (X-direction) directional second adjustable platform 153, this causes the second adjustable platform 153 can be moved in left-right direction under the first adjustable platform 152; underneath the bottom of second adjustable platform 153 is mounted with a back-and-forth (Y-direction) directional third adjustable platform 154, this causes the third adjustable platform 154 can be moved in back-and-forth direction under said second adjustable platform 153.

Please refer to FIGS. 1, 2 and 3, on one side of said first adjustable platform 152 is an adjusting base 1521, inside said adjusting base 1521 is a joint pole 1523, and on one side of the said second adjustable platform 153 is a second adjusting base 1531, inside the second adjusting base 1531 is an adjusting pole 1532, the front end of said adjusting pole 1532 joins onto the end of said joint pole 1523, so when turning the adjusting pole 1532, the first adjusting base 1521 moves in left-right direction, this movement further brings the left-right movement of the second adjustable platform 153. Thus, turning the adjusting pole 1532 is to cause said second adjustable platform 153 to bring the fix base plate 151 to move in left-right direction, this further brings the fixing tool 13 to move in left-right direction. As a result, the object 20 can be moved forward or withdrawn back from the cutting blade 12.

Please refer to FIGS. 1, 2 and 3 again, on one side of said third adjustable platform 154 is an adjusting screw 1541, the adjusting screw 1541 joins into a hole formed on said third adjustable platform 154, its outer end has a turning wheel 1542, on the turning wheel is a handle 1543, using the handle 1543 to turn the wheel 1542, the adjustable platform 154 can be caused to move in back-and-forth direction (Y-direction). That is to say, the back-and-forth movement of said third adjustable platform 154 brings the back-and-forth movement of the main fix base plate 151, this further moves the fixing tool 13 in back-and-forth direction, and thus pushes the object 20 approaching or separating from the cutting blade 12.

Please refer to FIGS. 1, 2 and 3 again, there is a cover 17 to shield the second motive power source 14 and the fixing tool 13, such that second motive power source 14 and fixing tool 13 are protected.

In conclusion, since the rotational cutting machine of present invention is not disclosed previously and it does not have been sold anywhere, therefore, it is believed to be an invention of novelty. Moreover, the unique character and ability of present invention are more advanced, it is then believed that the present invention is an invention with progressiveness, and meets the requirement of patent application according to relevant Patent Law.

Although the present invention has been described with a certain degree of particularity, the present disclosure has been made by way of example and changes in details of structure may be made without departing from the spirit thereof.

What is claimed is:

1. A rotational cutting machine having a base and a moveable platform on said base, said cutting machine characterized in that:

a cutting blade and a first motive power source on one side of said base for rotating said cutting blade, and a fixing tool for tightly holding an object to be cut on the other side of said base near said cutting blade;

said fixing tool set on said moveable platform, and a second motive power source for rotating the object to be cut beside said fixing tool wherein in cutting the object to be cut the first motive power source rotating said cutting blade while the second motive power source rotates the object to be cut and the object to be cut is moved by said moveable platform into contact with said cutting blade such that the object tightly held by said fixing tool is touched with said cutting blade so as a result the object is cut quickly and accurately, and wherein a fix plate having a hole therein is fixed to said moveable platform and said fixing tool has a T-shaped sleeve with one end inserted into said hole of said fix plate on said base, and the other end of said T-shaped sleeve is exposed outside said hole and forms an outer flange; the object to be cut is clipped by a tubular holder and then the tubular holder is inserted into said T-shaped sleeve, the tubular holder has a main component and secondary component screwed into one entity, and a cylinder-shaped clipper inside the entity is made in an elastic construction with a plurality of clipping claws.

2. A rotational cutting machine having a base and a moveable platform on said base, said cutting machine characterized in that:

a cutting blade and a first motive power source on one side of said base for rotating said cutting blade, and a fixing tool for tightly holding an object to be cut on the other side of said base near said cutting blade;

said fixing tool set on said moveable platform, and a second motive power source for rotating the object to be cut beside said fixing tool wherein in cutting the object to be cut the first motive power source rotating said cutting blade while the second motive power source rotates the object to be cut and the object to be cut is moved by said moveable platform into contact with said cutting blade such that the object tightly held by said fixing tool is touched with said cutting blade so as a result the object is cut quickly and accurately, and wherein said cutting machine includes a first adjustable platform and a second adjustable platform, and;

wherein said first adjustable platform has an adjustable base on one side thereof, a joint pole inside said adjustable base, wherein said second adjustable platform has a second adjustable base on one side thereof, an adjusting pole inside said second adjustable base, the front end of the adjusting pole is joined to an end of said joint pole, so when the adjusting pole is turned, the adjustable base is moved in an X direction, this makes the second adjustable platform move in an X direction which moves said fix base plate in an X direction and then moves the fixing tool in an X direction, as a result, the object in the fixing tool is moved forward or withdrawn back from the cutting blade.

3. A rotational cutting machine as claimed in claim 1, having a base and a moveable platform on said base, said cutting machine characterized in that:

a cutting blade and a first motive power source on one side of said base for rotating said cutting blade, and a fixing tool for tightly holding an object to be cut on the other side of said base near said cutting blade;

said fixing tool set on said moveable platform, and a second motive power source for rotating the object to be cut beside said fixing tool wherein in cutting the object to be cut the first motive power source rotating said cutting blade while the second motive power source rotates the object to be cut and the object to be cut is moved by said moveable platform into contact with said cutting blade such that the object tightly held by said fixing tool is touched with said cutting blade so as a result the object is cut quickly and accurately, and wherein a third adjust platform includes an adjusting screw, and one end of said adjusting screw has a wheel, and on the side of said wheel is a handle, and by turning the wheel using the handle, the third adjustable platform is moved in a Y direction, which causes the fix base plate to be moved in a Y direction, and then the fixing tool, as a result, the object is moved approaching or separating from the cutting blade.

\* \* \* \* \*